United States Patent
Logie (10) Patent No.: US 11,688,069 B2
(45) Date of Patent: Jun. 27, 2023

(54) DYNAMIC AREA THRESHOLDING FOR AUTOMATIC CROP HEALTH CHANGE DETECTION AND ALERTING SYSTEM

(71) Applicant: Farmers Edge Inc., Winnipeg (CA)

(72) Inventor: Gordon Stuart James Logie, Lethbridge (CA)

(73) Assignee: Farmers Edge Inc., Winnipeg (CA)

( * ) Notice: Subject to any disclaimer, the term of this patent is extended or adjusted under 35 U.S.C. 154(b) by 397 days.

(21) Appl. No.: 17/098,660

(22) Filed: Nov. 16, 2020

(65) Prior Publication Data

US 2021/0158527 A1     May 27, 2021

Related U.S. Application Data

(60) Provisional application No. 62/939,373, filed on Nov. 22, 2019.

(51) Int. Cl.
| | |
|---|---|
| G06T 7/00 | (2017.01) |
| G08B 21/18 | (2006.01) |
| G06T 7/11 | (2017.01) |
| G06V 20/10 | (2022.01) |
| G06Q 50/02 | (2012.01) |

(52) U.S. Cl.
CPC .......... G06T 7/0016 (2013.01); G06Q 50/02 (2013.01); G06T 7/11 (2017.01); G06V 20/188 (2022.01); G08B 21/182 (2013.01); *G06T 2207/10032* (2013.01); *G06T 2207/30188* (2013.01)

(58) Field of Classification Search
None
See application file for complete search history.

(56) References Cited

U.S. PATENT DOCUMENTS

| | | |
|---|---|---|
| 9,113,590 B2 | 8/2015 | Johnson |
| 9,638,678 B2 | 5/2017 | Shriver et al. |
| 2014/0035752 A1* | 2/2014 | Johnson ............... A01B 79/005 340/601 |
| 2015/0130936 A1* | 5/2015 | Coram ...................... F03D 5/00 348/144 |

(Continued)

FOREIGN PATENT DOCUMENTS

| | | |
|---|---|---|
| CA | 3101681 | 1/2020 |
| CN | 106845806 A * | 6/2017 |

*Primary Examiner* — Emily C Terrell
*Assistant Examiner* — Nathan J Bloom
(74) *Attorney, Agent, or Firm* — Ryan W. Dupuis; Kyle R. Satterthwaite; Ade & Company Inc.

(57) ABSTRACT

A method and system for crop health change monitoring is provided. The method includes acquiring a companion image of a crop growing within a field at a first point in time, acquiring a master image of the crop growing within the field at a second point in time, and computing, using a processor, vegetation indices using the master image and the companion image for subsequently determining regions of change within the master image. An alert condition is determined if change within one or more of the regions of change is sufficient to meet defined criteria. If a minimum field area threshold is met, a modulation coefficient is applied to the defined criteria that determines the alert condition. The coefficient reduces area-based thresholds used in health detection in a manner proportional to the size of the agricultural field of interest.

20 Claims, 8 Drawing Sheets

(56) References Cited

U.S. PATENT DOCUMENTS

| | | | |
|---|---|---|---|
| 2015/0201605 A1* | 7/2015 | Groeneveld | G01C 21/3826 |
| | | | 701/410 |
| 2016/0223506 A1* | 8/2016 | Shriver | G06V 20/188 |
| 2016/0283791 A1* | 9/2016 | Ogura | H04N 23/11 |
| 2017/0124116 A1* | 5/2017 | League | G06F 16/29 |
| 2019/0259108 A1* | 8/2019 | Bongartz | A01G 31/042 |
| 2019/0392211 A1* | 12/2019 | Hartman | H04N 5/33 |
| 2020/0005038 A1* | 1/2020 | Logie | G06T 7/254 |

* cited by examiner

DYNAMIC AREA THRESHOLDING FOR AUTOMATIC CROP HEALTH CHANGE DETECTION AND ALERTING SYSTEM

RELATED APPLICATIONS

This application claims the benefit under 35 U.S.C. 119(e) of U.S. provisional application Ser. No. 62/939,373, filed Nov. 22, 2019.

TECHNICAL FIELD

This description relates to the detection of changes in crop health condition within an agricultural field. More specifically, this description relates to the use of remotely-sensed image data for automatic detection of regions of change within the field.

BACKGROUND

Remotely-sensed image data and products derived from that data (i.e., imagery products) are increasingly utilized in agriculture. This is because these data products can provide rapid, synoptic estimates of crop health condition over a large number of agricultural acres. Crop health condition can be estimated using vegetation indices derived from the original image spectral data. One example vegetation index is the Normalized Difference Vegetation Index (NDVI), which can demonstrate high correlations with crop biomass, productivity, and eventual yield. NDVI and other imagery products can also provide quantitative and visual indications of deleterious crop conditions such as pest, disease, or weather (i.e., hail) damage, as well as the presence of weeds.

Despite the utility offered by these imagery products, manual inspection of images can be very time consuming and tedious. This can be particularly true for growers operating very large farming operations. Manual inspection of images and imagery products can also require expertise and experience to properly interpret the data. As such, a method to automatically detect and highlight potential crop issues is desirable.

The size of an agricultural field may range widely. Smaller agricultural fields represent a special case, where area-based thresholds in the change detection system may lead to crop issues going undetected simply due to the size of the field. This is undesirable behavior, as a crop health change detection system should be capable of detecting valid issues regardless of field size.

SUMMARY

There has been previous methods and systems used for the detection and highlighting of areas of crop condition change within an agricultural field using remotely-sensed image data. These methods involve the computation of vegetation indices from multi-date images, and then the performance of comparisons between these multi-date vegetation index images. Regions of change are detected using a minimum-change threshold. When these change regions meet specified criteria (such as a minimum area threshold), a notification (alert) can be sent to an agricultural grower, informing them of the change in crop condition, and allowing them to view the change regions and associated map layers.

The previously-described methods makes use of several area-based thresholds. In cases where the agricultural field of interest is quite small, these area-based thresholds may not be readily exceeded even if a change of substantial magnitude occurs in the field. Change detection will be particularly suppressed when the size of the agricultural field is similar in magnitude to one or more of these area-based thresholds. To compensate for this phenomenon, a threshold modulator can be used to reduce the area-based thresholds in a manner proportional to the size of the agricultural field of interest.

According to one aspect of the present invention there is provided a method for crop health change monitoring of a crop growing within an agricultural field, the method comprising: (i) acquiring a companion image of the crop at a first point in time; (ii) acquiring a master image of the crop at a second point in time, the first point in time prior to the second point in time; (iii) computing, using a processor, vegetation indices using the master image and the companion image; (iv) determining, using the processor, regions of change within the master image using the vegetation indices; (v) determining an alert condition, using the processor, if change within one or more of the regions of change is sufficient to meet defined criteria; (vi) applying, using the processor, a minimum field area threshold for the field, and if the minimum field area threshold is met applying a modulation coefficient to the defined criteria used in determining the alert condition; and (vii) if the alert condition is determined, generating an alert indicative of a change in crop condition of the crop growing within the field between the first point in time and the second point in time and communicating the alert indicative of the change in crop condition over a network to a computing device configured to receive the alert.

The method may further include computing the modulation coefficient based upon a size of the agricultural field. For example, computing the modulation coefficient may include the further steps of (i) selecting, using the processor, one or more modulation coefficient equations among a plurality of equations based upon a defined selection parameter, and (ii) using the selected one or more modulation coefficient equations to compute the modulation coefficient. Preferably, the selection parameter comprises a size of the agricultural field.

When the defined criteria comprises one or more thresholds, the method preferably includes applying the modulation coefficient to the defined criteria by multiplying the one or more thresholds by the modulation coefficient. The modulation coefficient is preferably a numerical value between 0 and 1.

The method may further include (a) determining the regions of change by (i) classifying pixel values of a normalized vegetation index image based on the image into discrete classes for each image and (ii) computing a change in area for each of the discrete classes between the master image and the companion image; (b) determining the alert condition, in part, by comparing the change in area for one or more discrete classes to one or more area-based thresholds in which the one or more area-based thresholds at least in part define the criteria; and (c) applying the modulation coefficient to the one or more area-based thresholds.

The method may further include comparing the change in area for one or more discrete classes to one or more area-based thresholds by comparing the change in area for the one or more discrete classes to a plurality of the area-based thresholds, and applying the modulation coefficient to each one of the plurality of the area-based thresholds.

The method may further include (a) determining the regions of change within the master image using the vegetation indices by (i) subtracting a companion normalized vegetation index image based on the companion image from a master normalized vegetation index image based on the master image to create a change image, (ii) flagging pixels in the change image exceeding a change threshold, and (iii) removing contiguous groupings of change flagged pixels in the change image if the contiguous groupings are smaller than a region size threshold in which the region size threshold at least in part defines the criteria; and (b) applying the modulation coefficient to the region size threshold.

The method may further include (a) determining the regions of change within the master image using the vegetation indices by comparing the one or more of the regions of change with one or more regions of change associated with prior alerts to identifying new regions of change; (b) determining the alert condition by comparing the new regions of change to a minimum cumulative change area threshold in which the minimum cumulative change area threshold at least in part defines the criteria; and (c) applying the modulation coefficient to the minimum cumulative change area threshold.

According to a further aspect of the present invention there is provided a method for crop health change monitoring, the method comprising: (i) acquiring a companion image of a crop growing within a field at a first point in time; (ii) acquiring a master image of the crop growing within the field at a second point in time, the first point in time prior to the second point in time; (iii) computing, using a processor, vegetation indices using the master image and the companion image; (iv) applying, using the processor, a minimum field area threshold for the field and if the minimum field area threshold is met, computing a modulation coefficient; (v) determining, using the processor, regions of change within the master image using the vegetation indices and if the minimum field area threshold is met, using the modulation coefficient; (vi) if change within one or more of the regions of change is sufficient to meet defined criteria, then generating an alert indicative of a change in crop condition of the crop growing within the field between the first point in time and the second point in time; and (vii) communicating the alert indicative of the change in crop condition over a network to a computing device configured to receive the alert.

According to another aspect of the present invention there is provided a system for crop health change monitoring of a crop growing within an agricultural field, the system comprising a memory storing programming instructions thereon and at least one processor operably coupled to the memory so as to execute the programming instructions whereby said at least one processor is configured to: (i) acquire a companion image of the crop at a first point in time; (ii) acquire a master image of the crop at a second point in time, the first point in time prior to the second point in time; (iii) compute vegetation indices using the master image and the companion image; (iv) determine regions of change within the master image using the vegetation indices; (v) determine an alert condition if change within one or more of the regions of change is sufficient to meet defined criteria; (vi) apply a minimum field area threshold for the field, and if the minimum field area threshold is met apply a modulation coefficient to the defined criteria used in determining the alert condition; and (viii) if the alert condition is determined, (a) generate an alert indicative of a change in crop condition of the crop growing within the field between the first point in time and the second point in time and (b) communicate the alert indicative of the change in crop condition over a network to a computing device configured to receive the alert.

BRIEF DESCRIPTION OF DRAWINGS

The disclosed embodiments have other advantages and features which will be more readily apparent from the detailed description and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the disclosed principles. It is noted that wherever practicable similar or like reference numbers may be used in the figures and may indicate similar or like functionality. The figures depict embodiments of the disclosed system (or method) for purposes of illustration only.

Overview

With an ever-growing number of available imaging platforms, it is increasingly possible for growers to get very high-frequency imagery of their fields. Commercial satellite platforms are now capable of offering sub-daily revisit frequencies, and the proliferation of commercial-grade unmanned aerial platforms allows growers to obtain their own imagery. However, this higher image frequency also means it can be impractical for growers to manually sort through and analyze all the available data obtained from across their farms. Additionally, greater redundancy between images of a field can occur due to the higher revisit frequencies of imaging platforms, stemming from the fact that crop conditions generally remain stable over short time intervals (e.g., between subsequent revisits). Generally, a change in crop conditions between two instances in time (e.g., two images) will be of interest to the grower, while the crop condition remaining unchanged will not be.

To maximize the utility of high-frequency image data, a system for automatically detecting changes in the crop health condition within a field using derived image products is desirable. In a particular example, once a change in crop condition is detected, a notification may automatically be sent to the growers (or another third-party entity).

If such a system for automatic change detection made use of fixed area-based thresholds, and the agricultural field of interest was particularly small, then the system may artificially suppress detection of significant field-level changes simply because of the field size. To avoid this, a coefficient can be used to dynamically scale these area-based thresholds when fields are smaller than a defined size. A detailed description of how this coefficient is computed and implemented as part of a crop health change detection system follows.

System Environment

Figure 1:
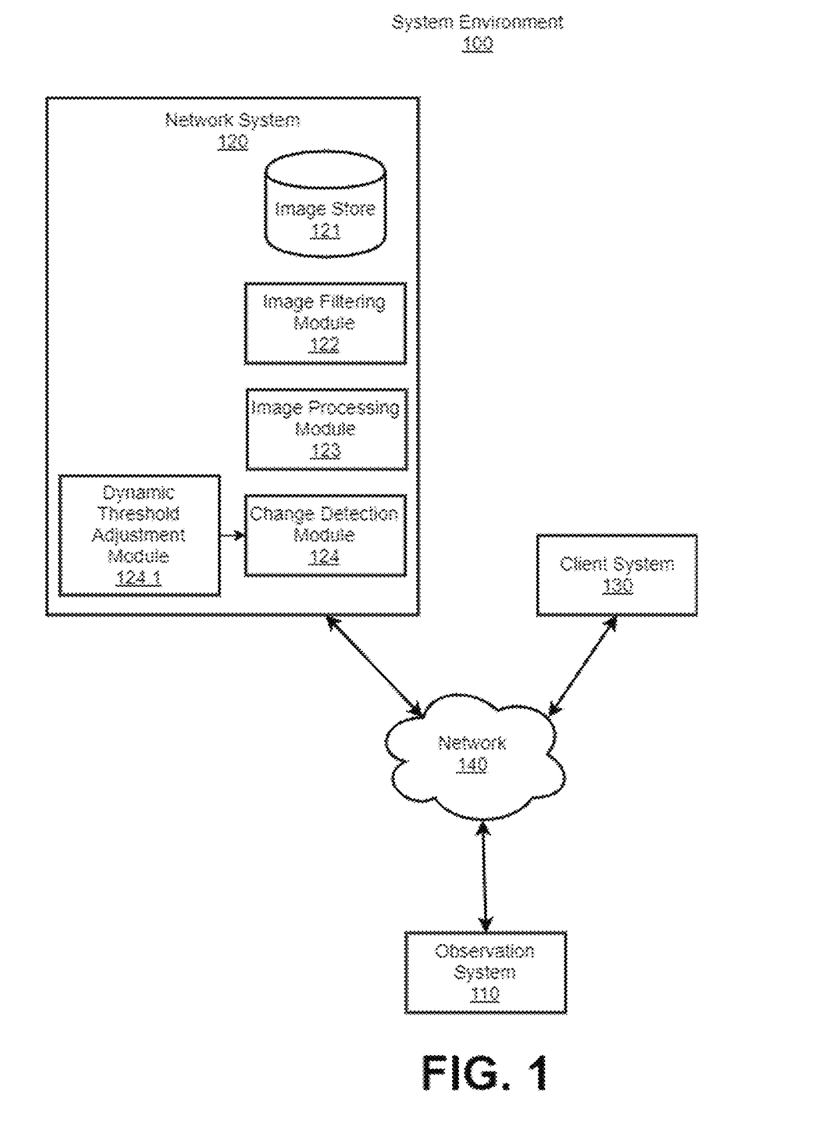
FIG. 1 illustrates a system environment for detection of crop health change over an agricultural field using remotely-sensed image products, according to one example embodiment.

FIG. 1 illustrates a system environment for detection of crop health change over an agricultural field using remotely-sensed image products, according to one example embodiment. Within the system environment 100 is an observation system 110, network system 120, client system 130, and a network 140, which links the different systems together. The network system 120 includes an image store 121, image filtering module 122, image processing module 123, and change detection module 124.

Other examples of a system environment are possible. For example, in various embodiments, the system environment 100 may include additional or fewer systems. To illustrate, a single client system may be responsible for multiple agricultural fields. The network system may leverage observations from multiple observation systems 110 to detect crop change for each of the agricultural fields. Furthermore, the capabilities attributed to one system within the environment may be distributed to one or more other systems within the system environment 100. For example, the change detection module 124 may be executed on the client system 110 rather than the network system 120.

An observation system 110 is a system which provides remotely-sensed data of an agricultural field. In an embodiment, the remotely-sensed data is an observed image. Herein, an observed image is an image or photograph of an agricultural field taken from a remote sensing platform (e.g., an airplane, satellite, or drone). The observed image is a raster dataset composed of pixels with each pixel having a pixel value. Pixel values in an observed image may represent some ground characteristic such as, for example, a plant, a field, or a structure. The characteristics and/or objects represented by the pixels may be indicative of the crop conditions within an agricultural field in the image.

The observation system 110 may provide images of an agricultural field over a network 140 to the network system 120, wherein said images may be stored in the image store 121. Additionally or alternatively, imagery derivatives generated by the image filtering module 122, image processing module 123, or change detection module 124 may also be stored in the image store 121.

The image filtering module 122 inputs an observed image and outputs a filtered image. The observed image may be accessed from the image store 121 or directly received from the observation system 110. A filtered image is the observed image that has been filtered such that it can be processed by the image processing module 123 and utilized for field change detection in the change detection module 124.

The image processing module 123 takes filtered images provided by the image filtering module 122 and processes them through to derivative products needed by the change detection module 124.

The change detection module 124 uses the image derivatives provided by the image processing module 123 to detect changes in the crop condition within an agricultural field. If certain criteria are met, the change detection module will generate a notification to be transmitted to the client system 110 via a network 140. Among these criteria for notification generation are several area-based thresholds. In order to scale these thresholds based on agricultural field area, the dynamic threshold adjustment module 124.1 computes a field area-based coefficient, which is applied to these area-based thresholds.

Image Filtering

Filtering of images provided by the observation system 110 or retrieved from the image store 121 is performed using the image filtering module 122. Image filtering is performed to ensure images are suitable for use in automated crop health change detection.

There are numerous reasons why an image may be unsuitable for change detection. Pixel values in an observed image obtained from a remote sensing platform are a measurement of electromagnetic radiation (EMR) originating from the sun (a quantity hereafter referred to as radiance), passing through the atmosphere, being reflected from objects on the Earth's surface (i.e., an agricultural field), then passing through part or all of the atmosphere once again before being received by a remote sensor (a quantity hereafter referred to as radiance). The proportion of radiance received by ground objects relative to the irradiance received by these objects (a measure hereafter referred to as surface reflectance) is of primary interest to remote sensing applications, as this quantity may provide information on the characteristics of these objects. However, atmospheric effects can introduce detrimental impacts on the measured EMR signal in an observed image, which can render some or all of the image pixels inconsistent, inaccurate, and, generally, untenable for use in accurate detection of crop health condition changes.

Atmospheric scattering and absorption is one major source of error in surface reflectance measurements. This effect is caused when molecules in the atmosphere absorb and scatter EMR. This scattering and absorption occurs in a wavelength-dependent fashion, and impacts EMR both during its initial transmission through the atmosphere, as well as after it is reflected from the Earth's surface and received by the remote sensing platform. Atmospheric absorption and scattering can cause various deleterious effects, including some EMR from the sun not making it to objects on the ground, some EMR from the sun scattering back into the remote sensor before reaching the ground, and some EMR reflected from the ground not reaching the remote sensor. While the EMR output from the sun is well understood and relatively invariant, atmospheric scattering and absorption can vary markedly both over time and space, depending on the type and amount of atmospheric molecules, and also depending on the path length of the EMR transmission through the atmosphere.

One adjustment for atmospheric effects is a correction of raw image data to top-of-atmosphere (TOA) reflectance units, a quantity hereafter referred to as TOA reflectance. This correction converts the radiance measured by the sensor to TOA reflectance units expressed as the ratio between the radiance being received at the sensor and the irradiance from the sun, with a correction applied based on the path of the EMR both from the sun to the target as well as from the target to the remote sensor. This first order correction can mitigate for some broad temporal and spatial attenuation of EMR transmission from the atmosphere, but does not account for the variable absorption and scattering, which can occur from variations in the atmospheric constituent particles.

A second order correction, referred to here as atmospheric correction, attempts to mitigate and reduce the uncertainties associated with atmospheric scattering and absorption. A range of atmospheric correction techniques of varying complexity have been employed within the field of remote sensing. These techniques are well known to a person skilled in the art and are consequently not further discussed here. The end result from atmospheric correction is an estimate of surface reflectance. To mitigate the impact of atmospheric scattering and absorption, in some embodiments the image filtering module 122 may employ either TOA or atmospheric correction techniques.

Another source of uncertainty that may impact observed image quality is the presence of atmospheric clouds or haze, and shadows cast from clouds, which can occlude ground objects and/or attenuate the radiance reflected from these objects. As such, the image filtering module 122 may utilize a cloud and/or shadow masking technique to detect pixels afflicted by these effects. Many techniques exist within the discipline for cloud and shadow masking and are also well known to a person skilled in the art.

The image filtering module 122 may also remove pixels from an observed image (e.g., using cropping, selective deletion, etc.). For example, an observed image may include obstacles or structures (e.g., farm houses, roads, farm equipment) that may be detrimental to assessment of the condition of crops within the field. The image filtering module 122 removes the impacted pixels by, for example, cropping out pixels from the observed image. Pixels impacted by clouds, shadows, and/or haze as detected by a cloud and shadow detection algorithm can also be removed in a similar fashion. The resulting image is an image that provides more accurate data for detection of change in the health condition of the crops.

In some cases the number of deleterious pixels in an image may exceed some critical threshold, thereby preventing the image from being useful in change detection. Similarly, some images may lack full coverage of an agricultural field of interest. In such cases, the image filtering module 122 may remove an image from any further processing and prevent its use in change detection.

Images that have been processed through the image filtering module 122 are hereafter referred to as filtered images.

Image Processing

Filtered images are passed from the image filtering module 122 to the image processing module 123. The image processing module processes the filtered images into derivatives needed by the change detection module 124.

The image processing module 123 computes vegetation indices (VIs) from input filtered images. Vegetation indices are derivatives created through mathematical operations performed on different image spectral bands, wherein a spectral band represents reflectance data measured over a specific wavelength range of EMR. The result from a VI calculation is a new image where each pixel value corresponds with the VI value calculated from the original band values for that pixel in the original image. Vegetation indices have long been used for remote sensing of vegetation since they often demonstrate high correlations with vegetation properties of interest, such as biomass, photosynthetic activity, crop yield, etc. As an example, the image processing module 123 may compute the Normalized Difference Vegetation Index (NDVI). The NDVI is calculated as:

$$NDVI = \frac{NIR - Red}{NIR + Red} \quad (1)$$

where NIR is the image reflectance in the near infrared (NIR) band, and Red is the image reflectance in the Red band. The NDVI is expressed as a decimal value between $-1$ and 1. NDVI values in the range of 0.2 to 0.8 or higher are typically considered an indication of active vegetation, with higher values being correlated with higher biomass, photosynthetic activity, etc. While the NDVI has been used in this example embodiment, other embodiments may utilize any other vegetation index or combination of indices.

Higher VI values generally indicate favorable vegetation conditions including higher biomass, higher photosynthetic activity, and higher eventual yields. Relatedly, increases in VI values from one image to the next may indicate an increase in any such favorable vegetation conditions, and decreases may conversely indicate a deterioration in vegetation condition. Increases in VI values may also indicate weed growth in the field.

The image processing module 123 may also compute image statistics, which are used to compute other derivatives and also used in portions of the change detection process. These statistics may include the mean, median, and standard deviation for the filtered image spectral bands and any derivative VIs.

Figure 2:
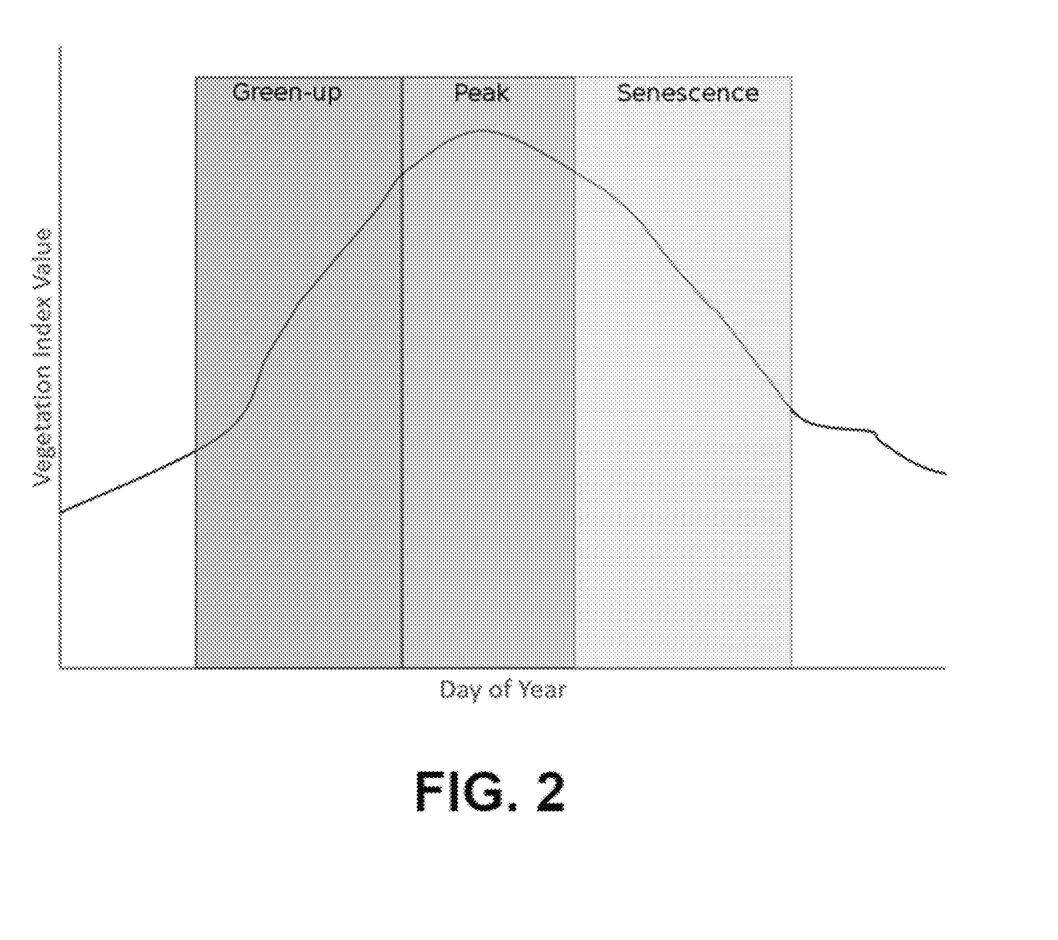
FIG. 2 illustrates a generalized growth curve for an exemplar crop as expressed through vegetation index values.

While increases and decreases in VI values in an agricultural field may indicate deleterious effects warranting the attention of the grower, there are other potential causes that need not trigger an alert to be generated. As an example, consider the seasonal growth pattern of a typical agricultural crop. Following planting, a plant will germinate and grow during the course of the season, increasing in both biomass and photosynthetic activity (green-up phase) before reaching a plateau (peak phase), followed by a gradual yellowing of the plants prior to harvest (senescence phase). FIG. 2 illustrates a generalized growth curve for an exemplar crop as expressed through vegetation index values. The green-up phase is typified by a continuous increase in VI values, while the peak phase sees a leveling off of the VI values, and finally the senescence phase is marked by a gradual decrease in VI values over time. These seasonal increases and decreases are part of the regular plant growth cycle, and are not of any particular concern to growers; however, direct change detection between VI images computed during the green-up or senescence phases may trigger an alert to be generated. There are other potential causes of increases/decreases in VI values not directly related to changes in crop health condition. As mentioned previously, differences in atmospheric constituents from one day to another can cause changes in band reflectance values and consequently VI values. While some level of correction of these effects is possible, it is difficult to fully correct, especially in an automated fashion. Finally, if different imaging platforms are used (i.e., different satellites in a constellation), there may be differences in calibration between them that cause differences in reflectance values, and consequently the VI values between images acquired by each platform.

To mitigate potential differences in VI values from one image to the next, unrelated to changes in field conditions, the image processing module 123 may also compute normalized vegetation index products from the earlier calculated vegetation index images. These images normalize the individual pixel values within a given VI image based on a statistical measure of central tendency (i.e., the mean or median value). For example, a normalized NDVI image may be computed by the image processing module 123 as follows:

$$NormNDVI = NDVI_{pixel} - NDVI_{median} \quad (2)$$

where NormNDVI is the normalized NDVI value for a given pixel, $NDVI_{pixel}$ is the original NDVI value for the pixel, and $NDVI_{median}$ is the median NDVI value for the entire NDVI image.

The use of normalized VI images for the change detection phase can help to compensate for increases and decreases in the VI values between one image and the next due to issues including regular crop growth cycles, differences in atmospheric conditions, and differences in remote sensor calibration.

The final derivative that may be produced by the image processing module 123 is a classified normalized VI image. This makes use of a classification scheme to break the continuous normalized VI pixel values into discrete classes. In an example embodiment, the classification scheme may appear as in Table 1:

TABLE 1

Example Classification Scheme for a Normalized NDVI Image

| Normalized NDVI Range | New Classified Value |
|---|---|
| $X \leq -0.075$ | 1 |
| $-0.075 < X < -0.025$ | 2 |
| $-0.025 \leq X \leq 0.025$ | 3 |
| $0.025 \leq X \leq 0.075$ | 4 |
| $X \geq 0.075$ | 5 |

After creation of the classified image, the area of each class is computed. This computation is performed by calculating the number of pixels within a given class and multiplying by the area represented by a single pixel.

All image processing stages are performed on every filtered image entering the image processing module. All image processing derivatives may then be stored in the image store 121 to be accessed in subsequent change detection runs, stored in the computer memory, and/or recomputed as required.

Change Detection

The change detection module 124 is used to detect changes in a field's crop health condition using the imagery products derived from the image processing module 123. Change detection can examine either positive change or negative change. Positive change looks for increases in normalized VI values between image pairs, and can be useful for locating areas of plant growth, which could be indicative of weed growth in a field. Negative change looks for decreases in normalized VI values between image pairs, and can be useful for locating areas where the relative crop condition is declining due to various crop ailments such as disease, weather damage, pest damage, poor nutrient content, and so on. The change detection process is the same for either positive or negative change; only the specific parameters and thresholds utilized may change.

Figure 3:
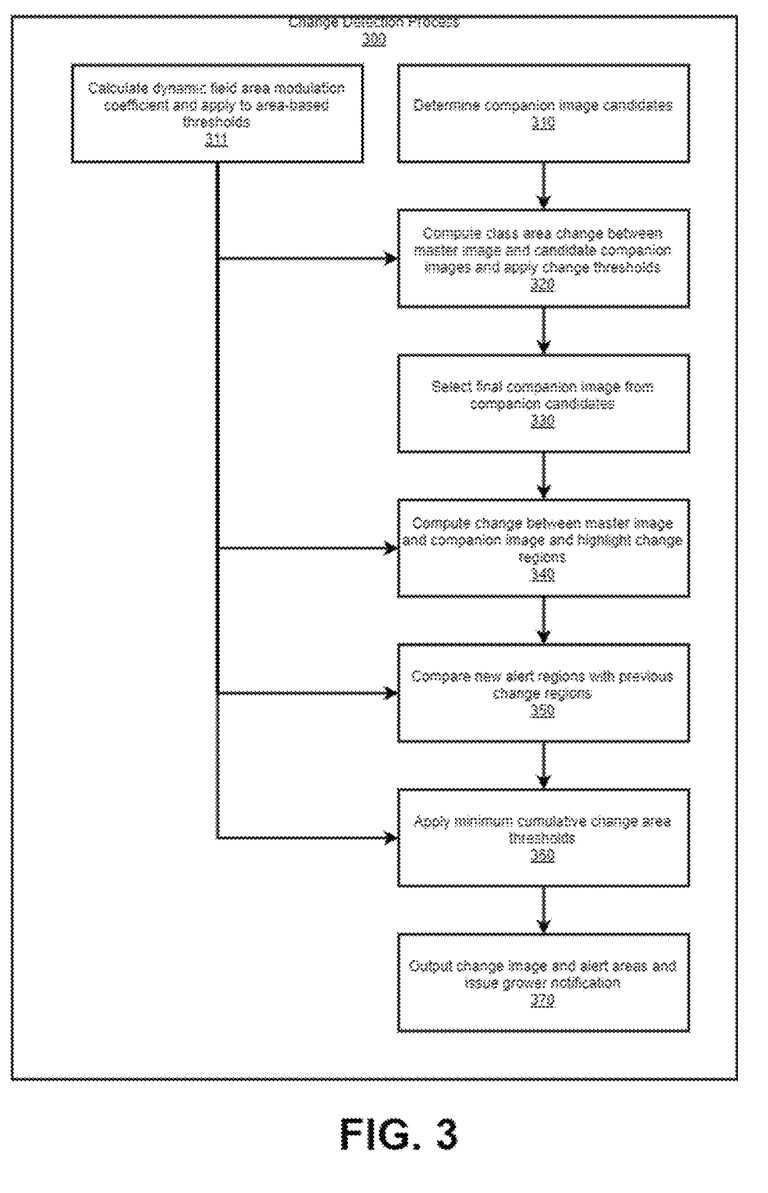
FIG. 3 illustrates the process for detecting crop condition change in an agricultural field, according to one example embodiment.

FIG. 3 illustrates the process for detecting crop condition change in an agricultural field. The change detection process 300 is executed by the change detection module 124 for a specific image in a sequence of filtered images over a specific agricultural field. This can be the most recent filtered image, or any filtered image in the sequence of filtered images (hereafter referred to as the image stack), or can be run sequentially on every image in the stack. Most typically the process will be run sequentially through the image stack within a specified time of interest (i.e., from the beginning of the crop season to the most recent image date), beginning with the oldest image in the stack and proceeding until the most recent image is processed.

The current image being processed is hereafter referred to as the "master image." Change detection is run between the master image and another image acquired at some point in the past relative to the master image date, an image hereafter referred to as the "companion image."

Step 310 selects potential companion images from the stack of images acquired on dates previous to the current master image date. The selection of candidate images is based on a date range parameter, with companion candidates needing to be acquired within a specified number of days of the master image date (i.e., candidates must be within 14 days of the master image date). The date range parameter can be utilized in order to ensure change detection is being run between pairs of images under comparable field conditions, avoiding potentially problematic comparisons, such as comparing an image acquired during senescence with an image acquired prior to crop growth. Note that in other embodiments, additional or alternative candidate selection criteria could be applied to further narrow down the list of companion candidates. As an example, a minimum/maximum threshold for the average VI value in the field could be used in an attempt to ensure actively growing vegetation is present in the field. Alternatively, if growth stage data (modelled or observed) were available for the field, then companion candidate images could be selected if they fall within a specified growth stage.

If no valid companion images are found, the change detection process for the current master image ends. If one or more candidate companion images are found, step 320 computes the change in classified areas between the master image and all companion candidates. Once the area change is computed, class area change thresholds are applied. These area change thresholds can be applied to the individual classes, or to a combination of class area changes. The calculation of changes in classified areas effectively represents the first step in a process of determining regions of change within a master image relative to companion images, while the class area change thresholds define a first part of criteria that must be met in order to ultimately determine an alert condition and in response to the alert condition generate an alert to be communicated to a user. Equations 3-6 provide a sample scheme for negative change class area thresholds, while Equations 7-8 provide a sample scheme for positive change class area thresholds, based on the classes outlined in Table 1.

$$\text{Class 1 Change} \geq \text{Change Threshold 1} \Rightarrow \text{Potential Alert} \quad (3)$$

$$\text{Class 1 Change} + \text{Class 2 Change} \geq \text{Change Threshold 2} \Rightarrow \text{Potential Alert} \quad (4)$$

$$(\text{Class 1 Change} + \text{Class 2 Change}) - (\text{Class 4 Change} + \text{Class 5 Change}) \geq \text{Change Threshold 3} \Rightarrow \text{Potential Alert} \quad (5)$$

$$(\text{Class 4 Change}*-1) + (\text{Class 5 Change}*-1) \geq \text{Change Threshold 4} \Rightarrow \text{Potential Alert} \quad (6)$$

Class 4 Change+Class 5 Change≥Change Threshold
5 ⇒ Potential Alert    (7)

Class 5 Change≥Change Threshold 6 ⇒ Potential Alert    (8)

In previous disclosures, the class area change thresholds were taken to be fixed quantities, invariant regardless of field size. However, this approach can lead to suppression of alert generation when the size of the agricultural field is small. In this disclosure, an additional step is added in the form of step 311. This step computes a modulation coefficient to dynamically adjust area-based thresholds in the change detection process 300. A detailed depiction of step 311 is shown in FIG. 4.

Figure 4:
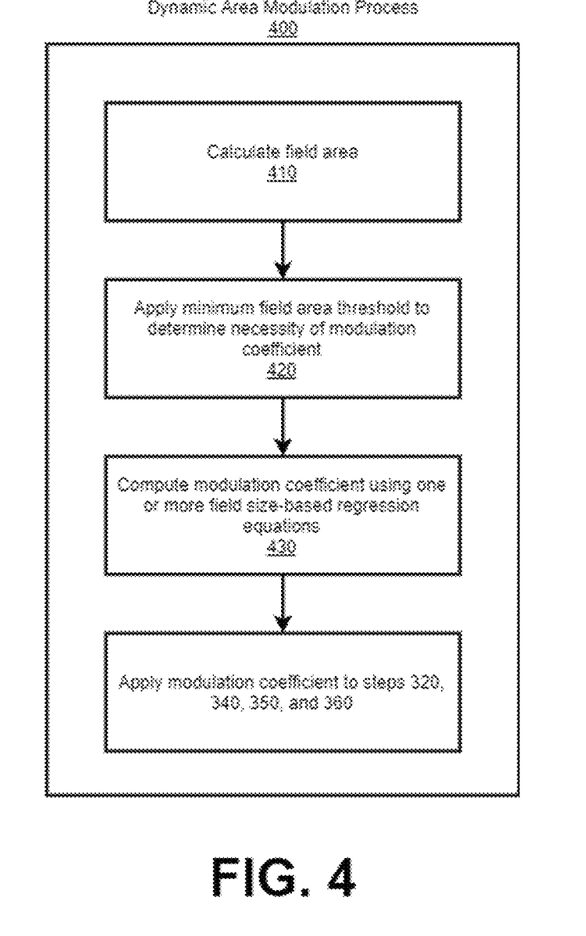
FIG. 4 illustrates the process for calculating a modulation coefficient to dynamically adjust area-based thresholds used in the crop health change detection system.

FIG. 4 illustrates the dynamic area modulation process 400. Step 410 computes the area of the agricultural field. Based on this field area, a minimum size threshold is applied in step 420 to determine if there is a necessity for modulation of area-based thresholds. In an embodiment, this threshold is set to 80 acres. If the size of the agricultural field exceeds this 80 acre threshold, the modulation coefficient is given a value of 1.0, which effectively disables it, with all area-based thresholds remaining at their default values. If the agricultural field size is below the 80 acre minimum threshold, then the modulation coefficient will be given a value between 0.0 and 1.0, which will depend on the size of the agricultural field.

In step 430, the modulation coefficient is calculated based on one or more regression equations, resulting in a numerical value between 0 and 1. In an embodiment, three regression equations are used, which are based on additional field-area thresholds. Equation 9 shows the regression equation used if the field area is less than 80 acres but greater than 50 acres. Equation 10 shows the regression equation used if the field area is between 20 acres and 50 acres. Equation 11 shows the regression equation used if the field area is less than 20 acres.

$$\text{Modulation Coefficient} = (\text{FieldArea} * 0.0075) + 0.2 \quad (9)$$

$$\text{Modulation Coefficient} = (\text{FieldArea} * 0.003) + 0.425 \quad (10)$$

$$\text{Modulation Coefficient} = (\text{FieldArea} * 0.022) + 0.045 \quad (11)$$

The modulation coefficient computed using Equation 9, 10, or 11 is used to multiply the different class area change thresholds used in Equations 3-8, reducing them for fields smaller than 80 acres in a manner proportional to the size of the field. These modified thresholds are then used in step 320.

If no change thresholds are exceeded, the change detection process for the current master image ends. If one or more thresholds are exceeded for a single companion image candidate, then step 330 is skipped. If one or more thresholds are exceeded for multiple companion image candidates, step 330 is used to select a single companion image from the eligible companion candidates. Numerous selection methods are possible. In an embodiment, the percentage by which each threshold was exceeded in each image is computed as follows:

$$\text{Threshold Excess} = \frac{\text{Class Area Change} - \text{Change Threshold}}{\text{Change Threshold}} * 100 \quad (12)$$

where ClassAreaChange is the change in area for a particular class or combination of classes as computed from any of Equations 3-8, and ChangeThreshold is the minimum area threshold for that class or combination of classes. To select a single image from multiple candidates, the ThresholdExcess percentages are compared, and the image with the highest ThresholdExcess value is selected as the alert comparison image.

Figure 5:
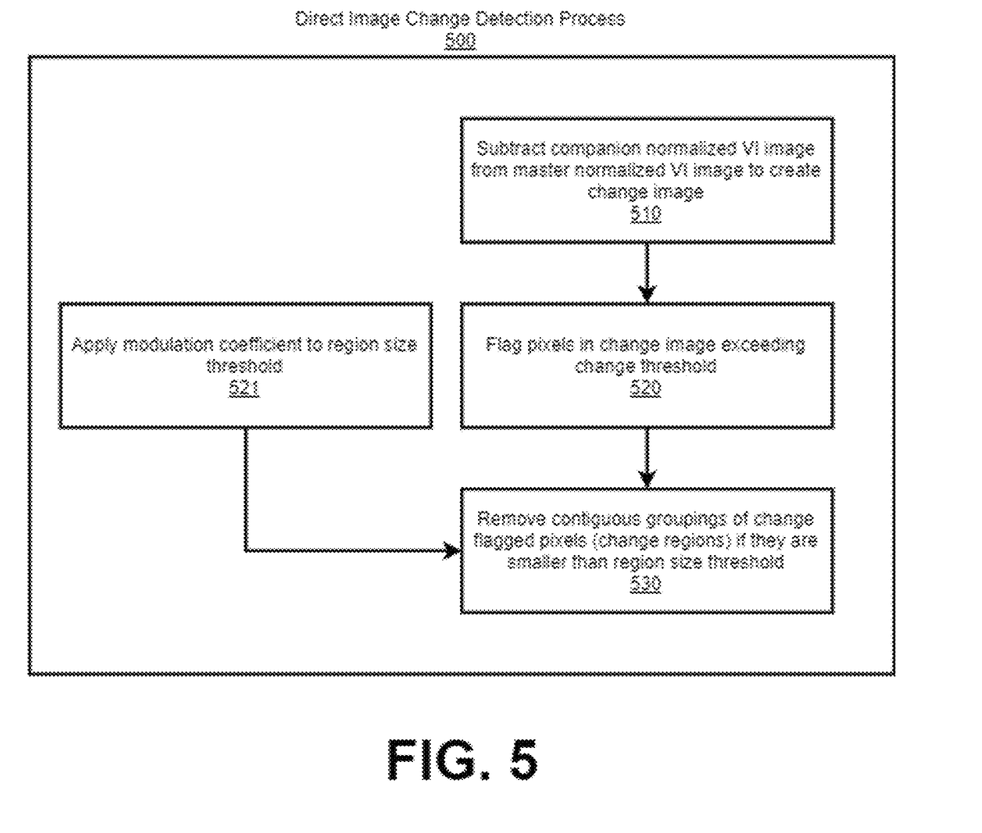
FIG. 5 illustrates the process for direct change detection between two images, according to one example embodiment.

Once a single companion image is selected, direct change detection between master and companion normalized VI images occurs in step 340. FIG. 5 illustrates the process for direct change detection between two images. Process 500 in FIG. 5 is a detailed illustration of step 340 in FIG. 3. First, the companion image normalized VI image is subtracted pixel-wise from the master image normalized VI image (step 510). This creates a new image hereafter called the "change image," where each pixel value represents the change in normalized VI values between the companion and master image.

Next, at step 520, a change threshold is used to flag pixels in the change image, which represent significant change. The threshold used is a negative value for negative change detection, and positive for positive change detection. To illustrate, if performing negative change detection with a threshold value of −0.03, any pixels with a change value of −0.03 or less would be flagged as significant negative change pixels. If performing positive change detection with a threshold value of 0.05, any pixels with a change value of 0.05 or greater would be flagged as significant positive change pixels.

Figure 6:
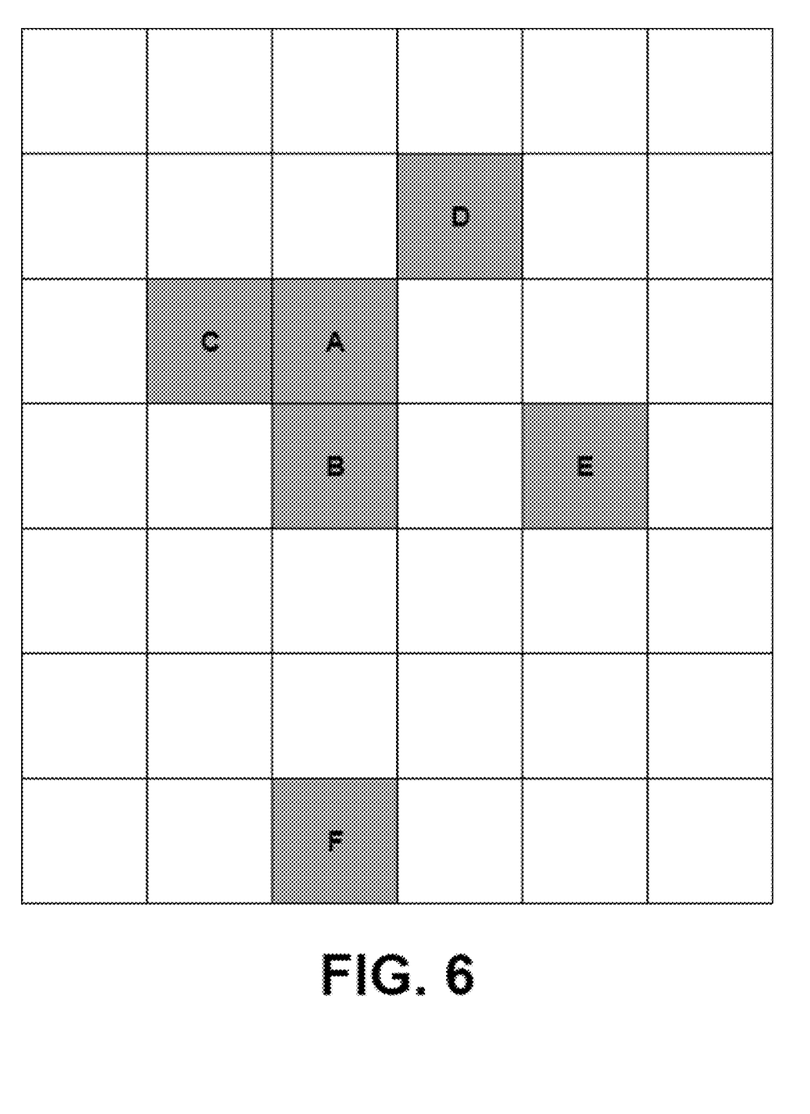
FIG. 6 illustrates an example of a pixel grid, with the highlighted labelled pixels representing flagged change pixels.

Following the flagging of change pixels in step 520, step 530 may be used to filter out isolated, small groupings of change pixels. This step is performed for a number of reasons. Firstly, very small groupings of change pixels may likely be attributable to image noise/uncertainty in either or both of the images being compared, rather than any real change in the field. Secondly, due to their small size, these very small groupings of pixels may also not represent any actionable intelligence for the grower. Finally, the presence of small isolated groupings of change pixels may make the final change alert image appear overly messy, and obscure the broader trends in the data. This filtering is performed using a minimum region size threshold, where the area of contiguous pixel groupings must exceed the threshold. A "contiguous grouping" of change pixels are those pixels which are considered to be spatially connected. Depending on the embodiment, the rules for connection can vary. FIG. 6 illustrates an example of a pixel grid, with the highlighted labelled pixels representing flagged change pixels. One connection rule only considers pixels which are immediately adjacent in the four cardinal directions to be connected. Using this rule, the pixels labelled "A", "B" and "C" would be considered connected, while "D", "E" and "F" are not connected. Another potential rule would consider all adjacent pixels in all four cardinal directions as well as the four diagonal directions surrounding a pixel to be connected. Using this rule, the "ABC" grouping of pixels would include "D" as well. Another potential rule may allow up to one pixel of separation between flagged pixels. Using this rule, the pixel labelled "E" would be included in the "ABCD" grouping.

The steps described above in applying the minimum region size threshold represent further steps in the process of determining regions of change within the master image relative to a selected companion image, while the minimum region size threshold defines another part of the criteria that must be met in order to subsequently determine an alert condition.

In a previous disclosure, similar to other area-based thresholds, the minimum region size threshold used in step 530 was a fixed value, invariant regardless of field size. In this disclosure, as an additional step, the modulation coefficient computed in step 311 is applied to the minimum region size coefficient (step 521). This reduces the minimum size requirement for contiguous groupings of pixels for fields smaller than the specified field area size threshold (in an embodiment, set to 80 acres). The addition of field area modulation makes this threshold dynamic for smaller fields, allowing smaller groupings of alert pixels. This allowance should not impact the previously discussed issues with noise, as these smaller alert pixel groupings will appear proportionally larger for smaller fields.

Referring back to FIG. 3, once the direct change detection process is completed, after the minimum area filtering, it is possible that no contiguous groupings of change pixels (hereafter referred to as "change regions") are left. In this case, the change detection process for the current master image ends. If some change regions remain, Step 350 is used to compare the new change regions with change regions from previous change alert images. The rationale for comparison with previously-generated change regions is to avoid or reduce the potential for repeatedly alerting growers to problems in their field that they have already been notified to previously. In an embodiment, this comparison is performed against all change regions generated from master images within a specified date range from the current master image (i.e. within seven days). Portions of the current change regions which were included in previous alert regions may then be removed, or be otherwise flagged as having been included in previous change alerts.

If any change pixels were removed as a result of step 350, the spatial filtering of contiguous change regions may be repeated here, following the logic described in step 530.

In step 360, minimum cumulative change area thresholds are applied to decide whether or not to issue a new change alert. This step is taken to avoid issuing many change alerts to growers wherein only very small portions of the field are highlighted in each. In an embodiment, new change regions are those groupings of change pixels which were not flagged in any previous alert images compared in step 350. If no previous alert images were compared, then all change regions are considered new. The cumulative area of the new change regions is calculated, and a minimum cumulative change area threshold is applied. If the cumulative area of the new change regions is less than the threshold, then the change detection process ends and no change alert is issued.

The steps described above in applying the minimum cumulative change threshold represent further steps in the process of determining regions of change within the master image relative to a selected companion image, while the minimum cumulative change threshold defines another part of the criteria that must be met in order to subsequently determine an alert condition.

Yet again, in a previous disclosure, the minimum cumulative change area threshold used in step 360 was taken as a fixed, invariant quantity. In this disclosure, the field area modulation coefficient computed in step 311 is applied to the minimum cumulative change area threshold, reducing the cumulative alert size needed to issue an alert to the grower for smaller fields. This additional step will prevent the change detection system from filtering out significant changes within small agricultural fields, especially in cases where the field size is similar to the minimum cumulative change area threshold.

If recent previous alerts were compared in step 350, a second threshold may also be applied. This threshold is a minimum percentage growth threshold, which requires the cumulative new alert area to be greater than a specified percentage of the cumulative area of the recent previously generated change regions compared in step 350. This percentage growth is computed as follows:

$$\text{Change Area Percent Growth} = \frac{\text{New Change Area} - \text{Previous Change Area}}{\text{Previous Change Area}} * 100 \qquad (10)$$

where New Change Area is the cumulative area of the new change regions, and Previous Change Area is the cumulative area of the recent previously generated change regions compared in step 350. If the Change Area Percent Growth does not exceed the specified percentage threshold, the change detection process ends here and no change alert is issued.

If the thresholds in step 360 are exceeded, then a crop health change alert may be issued to the grower (step 370). The alert may be issued as a notification which is transmitted to a client system 130 over a network 140. A change alert image may also be generated and stored in the image store 121. The notification sent to the grower may also include the change alert image directly, or may direct growers to a method for viewing the change image. If comparisons with previous change alerts were performed in step 350, the highlighted change regions in the change image may include all change pixels from the current change alert, or only those pixels representing new change regions which were not included in previous change alerts.

Figure 7:
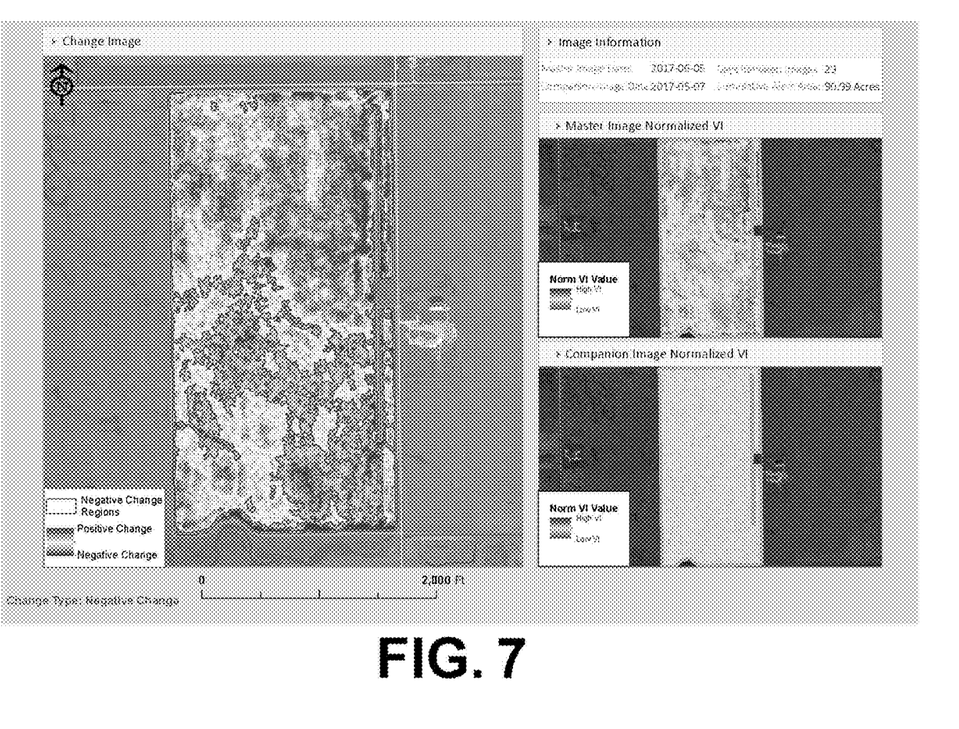
FIG. 7 illustrates an example of a change alert image generated by the change alerting system of the present invention.

FIG. 7 illustrates an example of how a change alert image generated by the change alerting system may appear. In FIG. 7, the larger image is the change image, shown in a divergent red-white-green color scheme, where red tones indicate negative change, green tones indicate positive change, and white tones indicate neutral areas with minimal change. Overlaid on the change image are the regions of significant change, shown as a blue outline. The smaller images show the normalized VI layers for the master and companion images. These images use a red-yellow-green color scheme, with below-average VI values shown as red tones, VI values close to average shown as yellow tones, and above-average VI values shown as green tones.

Taken as a whole, the addition of the small field area modulation coefficient computed in step 311, and subsequent dynamic reduction in various area-based thresholds which were previously set to fixed values, represents a significant improvement in the performance of the change detection system with small agricultural fields.

Example Computer System

Figure 8:
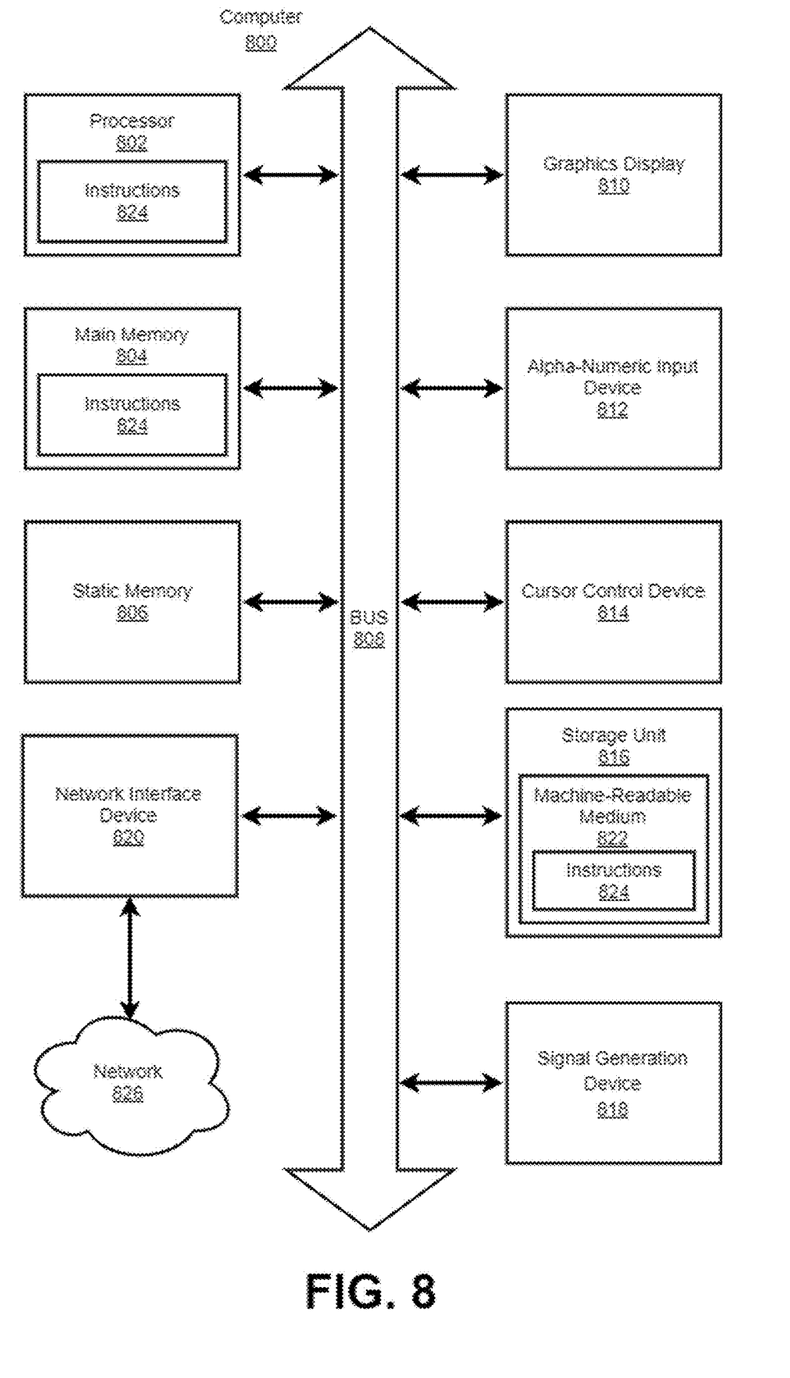
FIG. 8 is a block diagram illustrating components of an example machine for reading and executing instructions from a machine-readable medium, according to one example embodiment.

FIG. 8 is a block diagram illustrating components of an example machine for reading and executing instructions from a machine-readable medium. Specifically, FIG. 8 shows a diagrammatic representation of network system 120 and client device 130 in the example form of a computer system 800. Thus, the computer system implements the method 300 of FIG. 3. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the client device 130 or network system 120 described in FIG. 1. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 120) via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but is not limited to, data repositories in the form of solid-state memories, optical media, and magnetic media.

Upon reading this disclosure, those of skill in the art will appreciate still additional alternative structural and functional designs for systems, methods, and apparatus for monitoring crop conditions within agricultural fields. For example, differences in the manner in which images are obtained are contemplated including satellite imagery, aerial imagery from drones, or other types of imagery. Variations in specific image processing algorithms are contemplated. Variations in the types of vegetation indices used are contemplated. Various steps described in processing are optional and need not necessarily be performed in a particular embodiment. Other variations are contemplated as may be appropriate based on a particular crop, particular images used, available computing resources, or other factors. Thus, while particular embodiments and applications have been illustrated and described, it is to be understood that the disclosed embodiments are not limited to the precise methodologies disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A method for crop health change monitoring of a crop growing within an agricultural field, the method comprising:
   acquiring a companion image of the crop at a first point in time;
   acquiring a master image of the crop at a second point in time, the first point in time prior to the second point in time;
   computing, using a processor, vegetation indices using the master image and the companion image;
   determining, using the processor, regions of change within the master image using the vegetation indices;
   determining an alert condition, using the processor, if change within one or more of the regions of change is sufficient to meet defined criteria;
   applying, using the processor, a minimum field area threshold for the field, and if the minimum field area threshold is met applying a modulation coefficient to the defined criteria used in determining the alert condition; and
   if the alert condition is determined, (i) generating an alert indicative of a change in crop condition of the crop growing within the field between the first point in time and the second point in time and (ii) communicating the alert indicative of the change in crop condition over a network to a computing device configured to receive the alert.

2. The method according to claim 1 further comprising computing the modulation coefficient based upon a size of the agricultural field.

3. The method according to claim 2 wherein said computing the modulation coefficient further comprises (i) selecting, using the processor, one or more modulation coefficient equations among a plurality of equations based upon a defined selection parameter, and (ii) using the selected one or more modulation coefficient equations to compute the modulation coefficient.

4. The method according to claim 3 wherein the selection parameter comprises a size of the agricultural field.

5. The method according to claim 1 wherein the defined criteria comprises one or more thresholds, and said applying the modulation coefficient to the defined criteria comprises multiplying the one or more thresholds by the modulation coefficient.

6. The method according to claim 1 wherein the modulation coefficient is a numerical value between 0 and 1.

7. The method according to claim 1 wherein:
   said determining, using the processor, the regions of change within the master image using the vegetation indices further comprises, for each image, classifying pixel values of a normalized vegetation index image based on the image into discrete classes and computing a change in area for each of the discrete classes between the master image and the companion image;

said determining the alert condition further comprises comparing the change in area for one or more discrete classes to one or more area-based thresholds, the one or more area-based thresholds at least in part defining the criteria; and the method further comprising applying the modulation coefficient to the one or more area-based thresholds.

8. The method according to claim 7 wherein said comparing the change in area for one or more discrete classes to one or more area-based thresholds comprises comparing the change in area for the one or more discrete classes to a plurality of the area-based thresholds, the method comprising applying the modulation coefficient to each one of the plurality of the area-based thresholds.

9. The method according to claim 1 wherein:

said determining, using the processor, the regions of change within the master image using the vegetation indices further comprises (i) subtracting a companion normalized vegetation index image based on the companion image from a master normalized vegetation index image based on the master image to create a change image, (ii) flagging pixels in the change image exceeding a change threshold, and (iii) removing contiguous groupings of change flagged pixels in the change image if the contiguous groupings are smaller than a region size threshold, the region size threshold at least in part defining the criteria;

the method further comprising applying the modulation coefficient to the region size threshold.

10. The method according to claim 1 wherein:

said determining, using the processor, the regions of change within the master image using the vegetation indices further comprises comparing the one or more of the regions of change with one or more regions of change associated with prior alerts to identifying new regions of change;

said determining the alert condition further comprises comparing the new regions of change to a minimum cumulative change area threshold, the minimum cumulative change area threshold at least in part defining the criteria; and the method further comprising applying the modulation coefficient to the minimum cumulative change area threshold.

11. A method for crop health change monitoring, the method comprising:

acquiring a companion image of a crop growing within a field at a first point in time;

acquiring a master image of the crop growing within the field at a second point in time, the first point in time prior to the second point in time;

computing, using a processor, vegetation indices using the master image and the companion image;

applying, using the processor, a minimum field area threshold for the field and if the minimum field area threshold is met, computing a modulation coefficient;

determining, using the processor, regions of change within the master image using the vegetation indices and if the minimum field area threshold is met, using the modulation coefficient;

if change within one or more of the regions of change is sufficient to meet defined criteria, then generating an alert indicative of a change in crop condition of the crop growing within the field between the first point in time and the second point in time;

communicating the alert indicative of the change in crop condition over a network to a computing device configured to receive the alert.

12. A system for crop health change monitoring of a crop growing within an agricultural field, the system comprising:

a memory storing programming instructions thereon;

at least one processor operably coupled to the memory so as to execute the programming instructions whereby said at least one processor is configured to:

acquire a companion image of the crop at a first point in time;

acquire a master image of the crop at a second point in time, the first point in time prior to the second point in time;

compute vegetation indices using the master image and the companion image;

determine regions of change within the master image using the vegetation indices;

determine an alert condition if change within one or more of the regions of change is sufficient to meet defined criteria;

apply a minimum field area threshold for the field, and if the minimum field area threshold is met apply a modulation coefficient to the defined criteria used in determining the alert condition; and if the alert condition is determined, (i) generate an alert indicative of a change in crop condition of the crop growing within the field between the first point in time and the second point in time and (ii) communicate the alert indicative of the change in crop condition over a network to a computing device configured to receive the alert.

13. The system according to claim 12 wherein said at least one processor is further configured to compute the modulation coefficient based upon a size of the agricultural field.

14. The method according to claim 13 wherein said at least one processor is further configured to select one or more modulation coefficient equations among a plurality of equations based upon a size of the agricultural field, and use the selected one or more modulation coefficient equations to compute the modulation coefficient.

15. The system according to claim 12 wherein the defined criteria comprises one or more thresholds, and wherein said at least one processor is further configured to apply the modulation coefficient to the defined criteria by multiplying the one or more thresholds by the modulation coefficient.

16. The system according to claim 12 wherein the modulation coefficient is a numerical value between 0 and 1.

17. The system according to claim 12 wherein said at least one processor is further configured to:

determine the regions of change within the master image using the vegetation indices by, for each image, classifying pixel values of a normalized vegetation index image based on the image into discrete classes and computing a change in area for each of the discrete classes between the master image and the companion image; and determine the alert condition by comparing the change in area for one or more discrete classes to one or more area-based thresholds, the one or more area-based thresholds at least in part defining the criteria; and apply the modulation coefficient to the one or more area-based thresholds.

18. The system according to claim 17 wherein said at least one processor is further configured to (i) compare the change in area for one or more discrete classes to one or more area-based thresholds by comparing the change in area for the one or more discrete classes to a plurality of the area-based thresholds, and (ii) apply the modulation coefficient to each one of the plurality of the area-based thresholds.

19. The system according to claim 12 wherein said at least one processor is further configured to:

determine the regions of change within the master image using the vegetation indices by: (i) subtracting a companion normalized vegetation index image based on the companion image from a master normalized vegetation index image based on the master image to create a change image, (ii) flagging pixels in the change image exceeding a change threshold, and (iii) removing contiguous groupings of change flagged pixels in the change image if the contiguous groupings are smaller than a region size threshold, the region size threshold at least in part defining the criteria; and apply the modulation coefficient to the region size threshold.

20. The system according to claim 12 wherein said at least one processor is further configured to:

determine the regions of change within the master image using the vegetation indices by comparing the one or more of the regions of change with one or more regions of change associated with prior alerts to identifying new regions of change;

determine the alert condition by comparing the new regions of change to a minimum cumulative change area threshold, the minimum cumulative change area threshold at least in part defining the criteria; and apply the modulation coefficient to the minimum cumulative change area threshold.

* * * * *